United States Patent
Kang et al.

(10) Patent No.: US 11,891,315 B2
(45) Date of Patent: Feb. 6, 2024

(54) ROTARY TYPE CAPACITIVE DEIONIZATION APPARATUS

(71) Applicant: DOOSAN ENERBILITY CO., LTD, Changwon (KR)

(72) Inventors: Wee Kwan Kang, Yongin (KR); Ho Yong Jo, Yongin (KR); Jang Yong You, Suwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 214 days.

(21) Appl. No.: 17/531,774

(22) Filed: Nov. 21, 2021

(65) Prior Publication Data

US 2022/0348481 A1    Nov. 3, 2022

(30) Foreign Application Priority Data

Apr. 30, 2021 (KR) ........................ 10-2021-0056223

(51) Int. Cl.
*C02F 1/469* (2023.01)
*C02F 1/461* (2023.01)

(52) U.S. Cl.
CPC ........ *C02F 1/4691* (2013.01); *C02F 1/46109* (2013.01); *C02F 2001/46123* (2013.01);
(Continued)

(58) Field of Classification Search
CPC ................ C02F 1/4691; C02F 1/46109; C02F 2201/46; C02F 2001/46123;
(Continued)

(56) References Cited

U.S. PATENT DOCUMENTS

| 5,395,492 A | * | 3/1995 | Schoeberl | ............. | C02F 1/4674 205/756 |
| 8,968,546 B2 | * | 3/2015 | Seed | ................... | C02F 1/46114 204/627 |

(Continued)

FOREIGN PATENT DOCUMENTS

| JP | 2012228674 A | 11/2012 |
| JP | 2019209297 A | 12/2019 |

(Continued)

OTHER PUBLICATIONS

Tang et al. "Various cell architectures of capacitive deionization: Recent advances and future trends" Water Research 150 (2019) 225-251 (Year: 2019).*

*Primary Examiner* — Luan V Van
*Assistant Examiner* — Alexander R. Parent
(74) *Attorney, Agent, or Firm* — Harvest IP Law, LLP

(57) ABSTRACT

A capacitive adsorption module assembly is proposed. The capacitive adsorption module assembly includes a plurality of capacitive adsorption modules, each having a disk-shaped spacer configured to form a flow path through which feed flows, a cation exchange membrane attached to any one of an upper surface and a lower surface of the spacer, a first electrode attached to the cation exchange membrane, an anion exchange membrane attached to the other of the upper surface and the lower surface of the spacer, and a second electrode attached to the anion exchange membrane, wherein the capacitive adsorption modules are vertically stacked such that adjacent capacitive adsorption modules share or contact the first electrode or the second electrode, and at least one first terminal and second terminal passing through the stacked modules being provided.

16 Claims, 10 Drawing Sheets

(52) U.S. Cl.
CPC ............... *C02F 2001/46133* (2013.01); *C02F 2001/46152* (2013.01); *C02F 2201/46* (2013.01)

(58) Field of Classification Search
CPC . C02F 2001/46138; C02F 2001/46152; B01D 61/4281; B01D 61/50; C25B 9/30; C25B 9/303; C25B 9/305; C25B 11/034
See application file for complete search history.

(56) References Cited

U.S. PATENT DOCUMENTS

| | | | |
|---|---|---|---|
| 9,695,070 B2* | 7/2017 | Averbeck | C02F 1/4691 |
| 10,689,272 B2* | 6/2020 | Ikeda | C02F 1/4693 |
| 2009/0159514 A1* | 6/2009 | Beldring | C02F 1/004 |
| | | | 210/97 |
| 2014/0069806 A1* | 3/2014 | Silver | C25B 1/02 |
| | | | 204/242 |
| 2016/0145124 A1* | 5/2016 | Servida | C02F 1/4691 |
| | | | 204/630 |
| 2018/0036685 A1* | 2/2018 | Kunteng | B01D 61/50 |
| 2021/0017050 A1* | 1/2021 | Thomassen | C02F 1/4672 |
| 2022/0009799 A1* | 1/2022 | Wood | C02F 1/463 |

FOREIGN PATENT DOCUMENTS

| | | |
|---|---|---|
| KR | 101479457 B1 | 12/2014 |
| KR | 101732188 B1 | 4/2017 |
| KR | 102011115 B1 | 8/2019 |
| KR | 102090616 B1 | 3/2020 |

\* cited by examiner

ROTARY TYPE CAPACITIVE DEIONIZATION APPARATUS

CROSS REFERENCE TO RELATED APPLICATION

This application claims priority to Korean Patent Application No. 10-2021-0056223, filed on Apr. 30, 2021, the disclosure of which is incorporated herein by reference in its entirety.

FIELD

Apparatuses and methods consistent with exemplary embodiments relate to a capacitive deionization apparatus and, more particularly, to a rotary type capacitive deionization apparatus capable of stably deionizing feed water containing a high concentration of dissolved ions without clogging a flow path.

BACKGROUND

It is desirable to discharge or reuse high-concentration raw water from a sewage or wastewater treatment plant through appropriate treatment to prevent environmental pollution and supplement scarce available water resources. Various processes such as physical, chemical, and biological precipitation, filtration, oxidation, dialysis, and adsorption can be applied to treat high-concentration raw water. The wastewater treatment method is appropriately designed in consideration of the type and concentration of substances contained in the high-concentration raw water, and for example, if a large amount of inorganic salts are contained, a capacitive deionization (CDI) technology is applied.

The concept of the capacitive deionization technology is illustrated in FIG. 1. Referring to FIG. 1, raw water contains various dissolved ions, and the raw water (also referred to as 'feed') is introduced into a capacitive deionization apparatus. The capacitive deionization apparatus includes a spacer for forming and maintaining a space through which feed flows, and an anode and a cathode are disposed opposite to each other on both sides of the spacer. An anion exchange membrane is disposed adjacent to the anode, and a cation exchange membrane is disposed adjacent to the cathode. Here, the anion exchange membrane is a membrane having selectivity to pass and retain only anions, and the cation exchange membrane is a membrane having opposite property and is a membrane having selectivity to pass and retain only cations.

In the capacitive deionization apparatus, when positive and negative power is applied to the anode and cathode, respectively, anions among the inorganic salts contained in the feed are electrically attracted to the anode so that the anions pass through the anion exchange membrane and are retained in the anode region. In contrast, cations in the feed are attracted to the cathode so that the cations are retained in the cathode region. In this way, in a charged state with positive and negative power applied to the anode and the cathode, respectively, the anions and the cations are separately accumulated in the capacitive deionization apparatus so that the dissolved ions of the feed passing through the capacitive deionization apparatus are reduced. That is, the feed is purified in the charging state of the capacitive deionization apparatus.

On the other hand, the capacitive deionization apparatus needs to be regenerated on a regular basis. The regeneration process is a process to recover the purification capacity of the capacitive deionization apparatus by discharging the anions and the cations accumulated in the anode and the cathode. The regeneration process is performed in a discharging state in which an anode and a cathode of the capacitive deionization apparatus is applied with negative power and positive power, respectively. In the discharging state, anions are discharged to the outside while passing through the anion exchange membrane by repulsive force of the negative power, whereas cations are discharged from the anode according to the same principle. The discharged high-concentration feed needs to be discharged after a separate treatment.

As described above, the capacitive deionization technology is used to purify feed to an appropriate concentration by removing various types of dissolved ions from the feed through capacitive adsorption. A commercialized capacitive deionization apparatus includes a plurality of stacked modules of FIG. 1 so that a spacer disposed between electrodes forms a flow path of the feed.

In the capacitive deionization apparatus, a thickness of the spacer is an important design factor. As the spacer becomes thinner, the intensity of electric field increases to enhance the deionization rate, whereas if the spacer is thinner, a space of a flow path becomes narrower, and contamination frequently occurs during the deionization process, thereby interfering with a continuous operation. Because this fouling phenomenon occurs too frequently in feed with a high concentration of dissolved ions, e.g., in excess of 3,000 ppm (equivalent to about 10,000 μs/cm in conductivity), the related art capacitive deionization apparatus is not suitable for use in the high concentration environment.

SUMMARY

Aspects of one or more exemplary embodiments provide a capacitive deionization apparatus capable of stable and continuous operation even in an environment in which a high-concentration feed is supplied.

Additional aspects will be apparent in part in the description which follows and, in part, will become apparent from the description from the following description, or may be learned by practice of the exemplary embodiments.

According to an aspect of an exemplary embodiment, there is provided a capacitive adsorption module assembly including: a plurality of capacitive adsorption modules, wherein each of the plurality of capacitive adsorption modules includes: a disk-shaped spacer configured to form a flow path through which feed flows, a cation exchange membrane attached to any one of an upper surface and a lower surface of the spacer, a first electrode attached to the cation exchange membrane, an anion exchange membrane attached to the other of the upper surface and the lower surface of the spacer, and a second electrode attached to the anion exchange membrane, wherein the capacitive adsorption modules are vertically stacked such that adjacent capacitive adsorption modules share or contact the first electrode or the second electrode, and at least one first terminal and second terminal passing through the stacked capacitive adsorption modules are provided.

The first terminal may be electrically connected to the first electrode of an odd-numbered capacitive adsorption module, and the second terminal may be electrically connected to the second electrode of an even-numbered capacitive adsorption module.

The spacer may include a pair of frames spaced apart by a predetermined distance to face each other, and a space between the pair of frames may form a flow path through which feed flows.

Each frame may include a circumferential frame part formed in a circumferential direction and a radial frame part formed in a radial direction to connect the circumferential frame part.

Each radial frame part of the pair of frames may be disposed so as not to overlap or face each other.

Each radial frame part of the pair of frames may form a curve having curvature in opposite directions.

The first terminal may be embedded in the odd-numbered capacitive adsorption module and coupled to a first nut electrically connected to the first electrode, and the second terminal may be embedded in the even-numbered capacitive adsorption module and coupled to a second nut electrically connected to the second electrode.

The stacked capacitive adsorption modules may be fixed by the coupling between the first terminal and the first nut and the coupling between the second terminal and the second nut.

The first terminal may be fixed with an insulator for the even-numbered electro-adsorption module, and the second terminal may be fixed with an insulator for the odd-numbered electro-adsorption module.

The capacitive adsorption module assembly may further include a rotary shaft inserted through the stacked capacitive absorption modules, wherein a first adapter is provided on one side of the rotary shaft to fix and electrically connect the first terminal of a first odd-numbered capacitive absorption module, and a second adapter is provided on the other side of the rotary shaft to fix and electrically connect the second terminal of a last even-numbered capacitive absorption module.

According to an aspect of another exemplary embodiment, there is provided a capacitive deionization apparatus including: a capacitive adsorption module assembly comprising a plurality of capacitive adsorption modules, each of the plurality of capacitive adsorption modules including: a disk-shaped spacer configured to form a flow path through which feed flows, a cation exchange membrane attached to any one of an upper surface and a lower surface of the spacer, a first electrode attached to the cation exchange membrane, an anion exchange membrane attached to the other of the upper surface and the lower surface of the spacer, a second electrode attached to the anion exchange membrane, and a rotary shaft inserted through the stacked capacitive absorption modules, wherein the capacitive adsorption modules are vertically stacked such that adjacent capacitive adsorption modules share or contact the first electrode or the second electrode, and at least one first terminal and second terminal passing through the stacked capacitive adsorption modules are provided, and wherein the first terminal is electrically connected to the first electrode of an odd-numbered capacitive adsorption module, and the second terminal is electrically connected to the second electrode of an even-numbered capacitive adsorption module; a casing hermetically accommodating the capacitive absorption module assembly and having a feed passage; a power source configured to supply DC power to both ends of the rotary shaft protruding to an outside of the casing; and a rotary driving unit configured to drive the rotary shaft.

A first adapter may be provided on one side of the rotary shaft to fix and electrically connect the first terminal of a first odd-numbered capacitive absorption module, and a second adapter may be provided on the other side of the rotary shaft to fix and electrically connect the second terminal of a last even-numbered capacitive absorption module.

The power source may supply DC power to the rotary shaft via a slip ring.

The power source may supply power to the capacitive adsorption module assembly such that (−) power is applied to one side of the rotary shaft on which the first adapter is mounted, and (+) power is applied to one side of the rotary shaft on which the second adapter is mounted so that the capacitive absorption module assembly is operated in a charging mode.

The power source may supply power to the capacitive adsorption module assembly such that (+) power is applied to one side of the rotary shaft on which the first adapter is mounted, and (−) power is applied to one side of the rotary shaft on which the second adapter is mounted so that the capacitive absorption module assembly is operated in a discharging mode.

The capacitive adsorption module assembly according to the exemplary embodiment implements a monopolar power supply structure so that the same potential difference occurs in electrodes of all capacitive adsorption modules to enable uniform deionization performance in the entire area without requiring a high voltage, thereby having an adaptation for the treatment of a high-concentration feed and excellent safety.

In addition, the capacitive adsorption module assembly according to the exemplary embodiment is implemented in a rotary type, thereby preventing the blockage of a narrow flow path and damage to the cation exchange membrane and the anion exchange membrane due to fouling. Accordingly, the rotary type capacitive adsorption module assembly enables the capacitive deionization apparatus to be adapted to higher concentration feed environment.

BRIEF DESCRIPTION OF THE DRAWINGS

The above and other aspects will be more apparent from the following description of the exemplary embodiments with reference to the accompanying drawings, in which.

DETAILED DESCRIPTION

Figure 1:
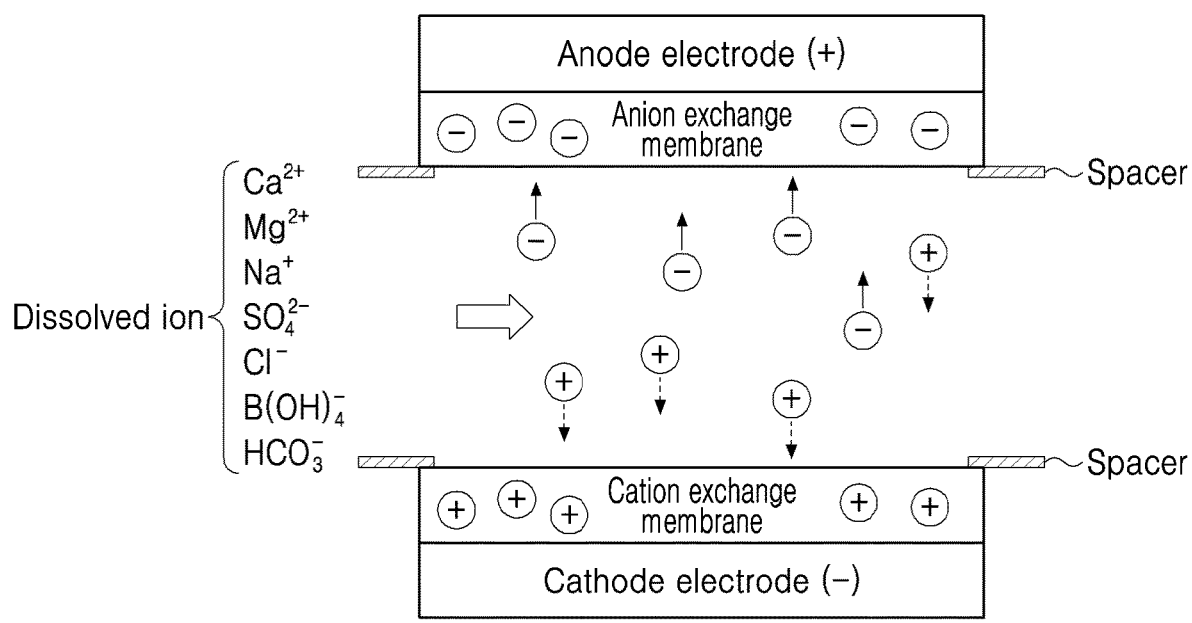
FIG. 1 is a diagram illustrating the concept of a capacitive deionization technology.

Various modifications and various embodiments will be described in detail with reference to the accompanying drawings. However, it should be noted that the various embodiments are not for limiting the scope of the disclosure to the specific embodiment, but they should be interpreted to include all of modifications, equivalents or substitutions of the embodiments included within the spirit and scope disclosed herein.

The terminology used herein is for the purpose of describing particular embodiments only and is not intended to limit the scope of the disclosure. As used herein, the singular forms "a", "an", and "the" are intended to include the plural forms as well unless the context clearly indicates otherwise. In this specification, the terms such as "comprises", "includes" and/or "have/has" should be construed as designating that there are such features, regions, integers, steps, operations, elements, components, and/or a combination thereof in the specification, not to exclude the presence or possibility of adding of one or more of other features, regions, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Unless otherwise defined, the terms including technical and scientific terms used herein have the same meaning as would be generally understood by those skilled in the relevant art. However, these terms may vary depending on the intentions of the person skilled in the art, legal or technical interpretation, and the emergence of new technologies. In addition, some terms are arbitrarily selected by the applicant. These terms may be construed per the meaning defined or described herein and, unless otherwise specified, may be construed on the basis of the entire contents of this specification and common technical knowledge in the art.

Hereinafter, exemplary embodiments will be described in detail with reference to the accompanying drawings. It is noted that like reference numerals refer to like parts throughout the various figures and exemplary embodiments. In certain embodiments, a detailed description of known functions and configurations that may obscure the gist of the present disclosure will be omitted. For the same reason, some of the elements in the drawings are exaggerated, omitted, or schematically illustrated.

Figure 2:
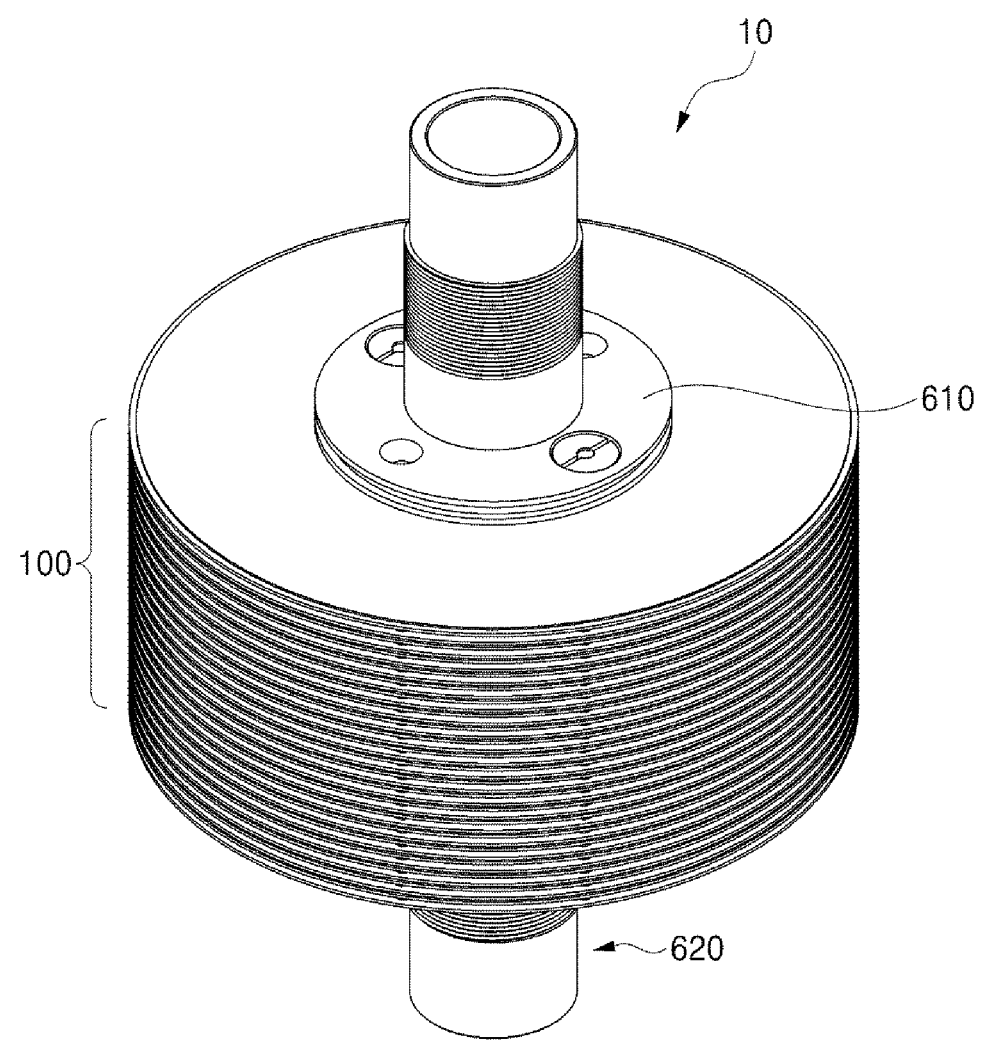
FIG. 2 is a view illustrating an external appearance of a capacitive adsorption module assembly according to an exemplary embodiment.
Figure 3:
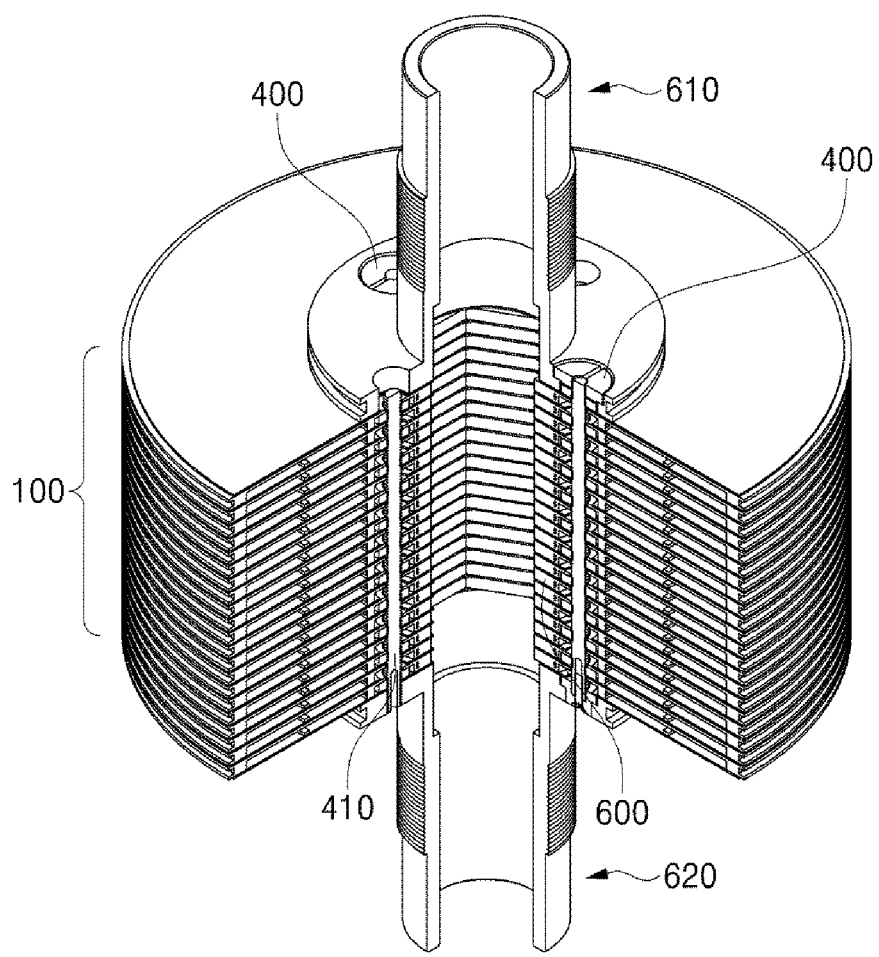
FIG. 3 is a partially cutaway view illustrating the capacitive adsorption module assembly of FIG. 2.
Figure 7:
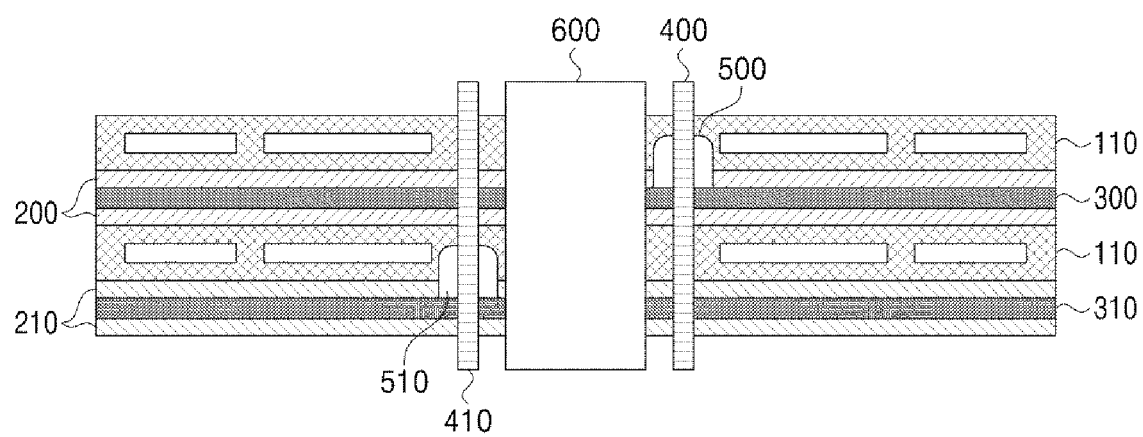
FIG. 7 is a view illustrating a stacked structure of a capacitive adsorption module.

FIG. 2 is a view illustrating an external appearance of a capacitive adsorption module assembly 10 according to an exemplary embodiment, FIG. 3 is a partially cutaway view illustrating the capacitive adsorption module assembly 10 of FIG. 2, and FIG. 7 is a view illustrating a stacked structure of a capacitive adsorption module 100.

Referring to FIGS. 2 and 7, the capacitive adsorption module assembly 10 is formed by vertically stacking a plurality of capacitive adsorption modules 100. The individual capacitive adsorption modules 100 have the same basic configuration. First, the capacitive adsorption module 100 includes a spacer 110, a first electrode 300, a second electrode 310, a cation exchange membrane 200, and an anion exchange membrane 210. The operating principle of the capacitive adsorption module 100 may refer to the description of FIG. 1.

The spacer 110 is a disk-shaped member that forms a flow path through which feed flows. In addition, the spacer 110 serves as a structure supporting the first electrode 300 and the second electrode 310, and the cation exchange membrane 200 and the anion exchange membrane 210. The spacer has a frame 112 structure in which a central region in a thickness-direction forms a flow path space. The feed introduced into the spacer 110 comes into contact with the cation exchange membrane 200 and the anion exchange membrane 210 on both sides of the spacer 110.

The cation exchange membrane 200 is attached to upper or lower surface of the spacer 110. The cation exchange membrane 200 selectively passes only cations, and the first electrode 300 is attached to the cation exchange membrane 200. Also, the anion exchange membrane 210 is attached to the other surface of the spacer 110, and the second electrode 310 is attached to the anion exchange membrane 210.

As a result, the cation exchange membrane 200 and the first electrode 300 are disposed on one side of the spacer disk with respect to the spacer 110, and the anion exchange membrane 210 and the second electrode 310 are disposed on the other side of the spacer disk, so that the feed flowing into the spacer 110 contacts both the cation exchange membrane 200 and the anion exchange membrane 210. That is, the structure as shown in FIG. 1 is formed.

Here, the first electrode 300 and the second electrode 310 may be connected to a (−) power source and a (+) power source, respectively, and vice versa. If (−) power is applied to the first electrode 300 and (+) power is applied to the second electrode 310, the capacitive adsorption action occurs so that cations pass through the cation exchange membrane 200 and are adsorbed to the first electrode 300 and anions pass through the anion exchange membrane 210 and are adsorbed to the second electrode 310. As such, the state in which the capacitive adsorption action occurs may be referred to as a charging mode. On the other hand, if opposite power is applied to the first electrode 300 and the second electrode 310, respectively, a discharging mode in which the adsorbed dissolved ions are discharged is operated.

The plurality of capacitive adsorption modules 100 are stacked in a vertical direction. Here, the vertical direction is a direction extending between both sides of the spacer 110 in which the cation exchange membrane 200 and the first electrode 300 are disposed, and the vertically stacked capacitive adsorption modules 100 form a columnar shape. Referring to FIGS. 2 and 3, twenty capacitive adsorption modules 100 may be stacked.

Referring to FIG. 7, the capacitive adsorption modules 100 are stacked in a direction in which the cation exchange membranes 200 and the anion exchange membranes 210 face each other in each capacitive adsorption module 100. This is because the first electrode 300 is attached to the cation exchange membrane 200 and the second electrode 310 is attached to the anion exchange membrane 210 so that the cation exchange membrane 200 and the anion exchange membrane 210 face each other when stacked, a short circuit occurs between the first electrode 300 and the second electrode 310 having different polarities when power is supplied in a monopolar manner.

For example, the monopolar power supply method is a power supply method for independently supplying power to the first electrodes 300 and the second electrodes 310 of all the stacked capacitive adsorption modules 100. In the monopolar power supply method, the same potential difference occurs in both the first electrodes 300 and the second electrodes 310 despite the complexity of the power supply structure so that a high voltage is not required and uniform deionization performance is achieved in the entire area, so it is suitable for the treatment of a high-concentration feed and has excellent safety. On the other hand, a bipolar method has a structure in which a voltage is applied only between the modules opposite to the stacked capacitive adsorption modules 100 and a gradually attenuated electric field is applied to the remaining intermediate capacitive adsorption modules 100. Therefore, although the bipolar method has a simple power supply structure, deionization becomes non-uniform and the voltage needs to be relatively increased. Accordingly, the present disclosure implements a monopolar-type power supply structure more suitable for treating a high-concentration feed.

Referring again to FIG. 7, the vertically adjacent upper and lower capacitive adsorption modules 100 are in contact with each other at the first electrodes 300 or the second electrodes 310. If all capacitive adsorption modules 100 are prefabricated and stacked in the same structure, adjacent capacitive adsorption modules 100 are electrically connected to each other by contacting each other at the first electrodes 300 or the second electrodes 310. Alternatively, when the capacitive adsorption modules 100 are manufactured and stacked one by one, after providing a first capacitive adsorption module having the first electrode 300, a second capacitive adsorption module is placed on the first capacitive adsorption module such that a cation exchange membrane 200 of the second capacitive adsorption module 100 may be attached to the first electrode 300 of the first capacitive adsorption module 100 (i.e., an anion exchange membrane may be attached to the second electrode 310). In this case, the assembly has a structure in which adjacent capacitive adsorption modules 100 share the first electrode 300 or the second electrode 310.

In order to supply power to each of the stacked capacitive adsorption modules 100, at least one first terminal 400 and second terminal 410 are stacked through the entire stacked capacitive adsorption modules 100. Here, the first terminal 400 is electrically connected to the first electrode 300 of the odd-numbered capacitive adsorption module 100, and the second terminal 410 is electrically connected to the second electrode 310 of the even-numbered capacitive adsorption module 100. In the adjacent capacitive adsorption modules 100, because the first electrodes 300 or the second electrodes 310 are electrically connected to each other, the first terminal 400 connected to the first electrode 300 of the odd-numbered capacitive adsorption module 100 is also connected to the first electrode 300 of the even-numbered capacitive adsorption module 100. The second terminal 410 has a similar arrangement.

According to the electrode connection structure, the first terminal 400 and the second terminal 410 supply power to the first electrode 300 and the second electrode 310 of all the stacked capacitive adsorption modules 100, respectively, thereby implementing the monopolar power supply structure.

Figure 6:
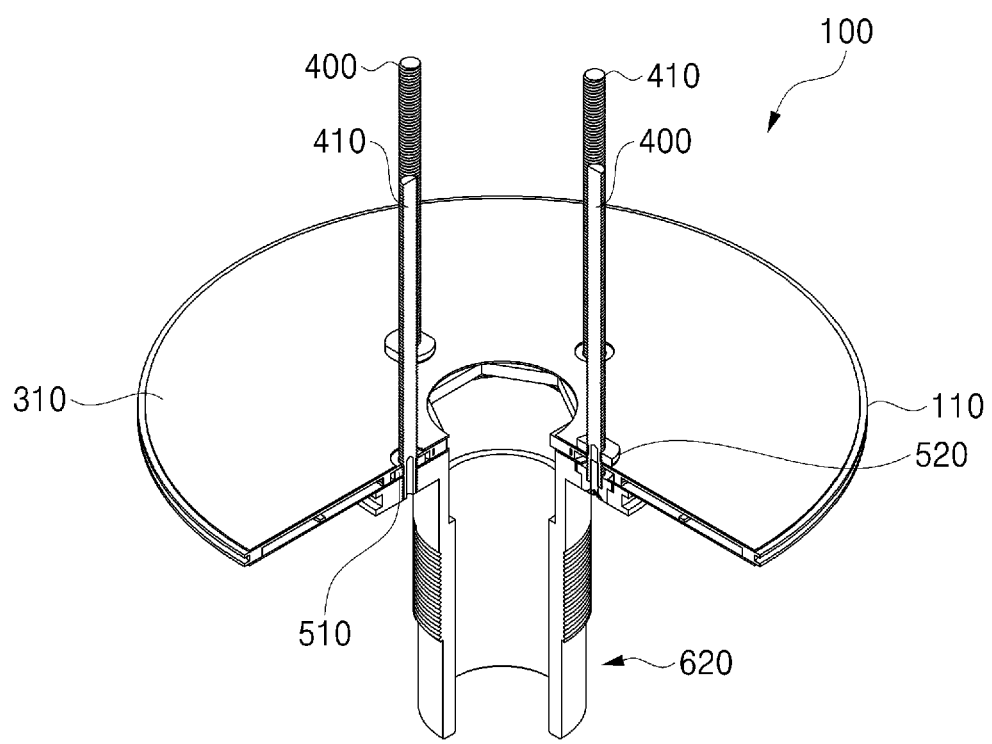
FIG. 6 is a view illustrating a connection structure between a capacitive adsorption module and first and second electrodes.

FIG. 6 is a view illustrating a connection structure between a capacitive adsorption module and first and second electrodes. In FIG. 6, the last even-numbered capacitive adsorption module 100 showing a connection structure of the first terminal 400 and the second terminal 410 is illustrated. Referring to FIG. 6, two first terminals 400 and two second terminals 410 are provided. The second terminal 410 is embedded in the even-numbered capacitive adsorption module 100 and is coupled to a second nut 510 electrically connected to the second electrode 310. The first terminal 400 is embedded in the odd-numbered capacitive adsorption module 100 and is coupled to a first nut 500 electrically connected to the first electrode 300. The capacitive absorption module 100 in which nut coupling structure of the first terminal 400 and second terminal 410 is alternately stacked is fixed to each other to form a rigid structure.

In addition, the second terminal 410 is fixed with an insulator 520 with respect to the odd-numbered capacitive adsorption module 100, and the second terminal 410 and the odd-numbered capacitive adsorption module 100 maintain a stable insulation state by the insulator 520. The first terminal 400 is also fixed to the even-numbered capacitive adsorption module 100 by the insulator 520.

Figure 4:
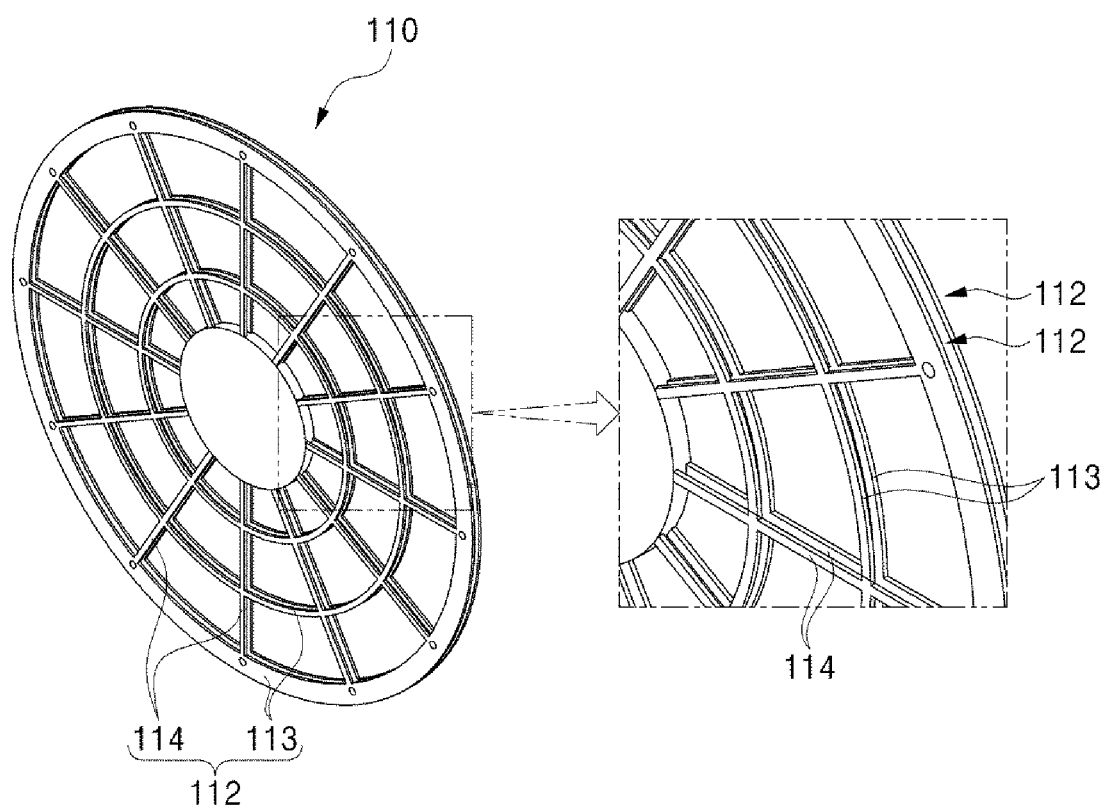
FIG. 4 is a view illustrating a spacer according to an exemplary embodiment.
Figure 5A:
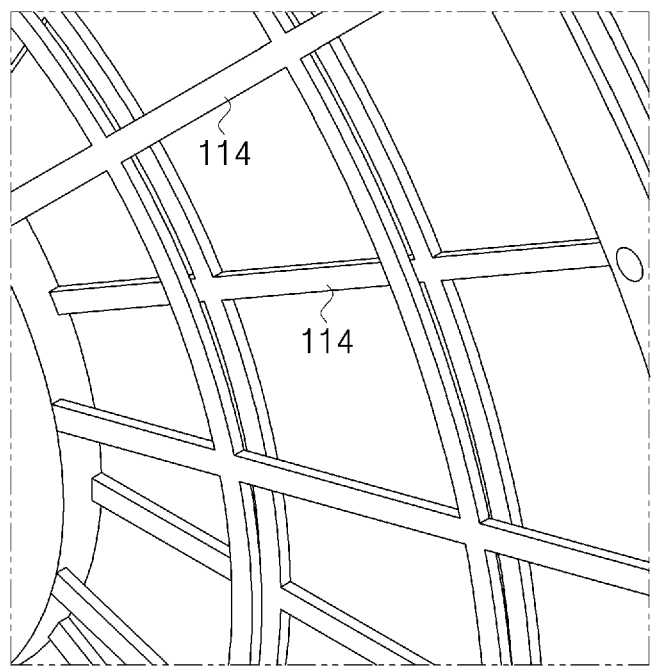
FIGS. 5A and 5B are views illustrating a spacer according to another exemplary embodiment.
Figure 5B:
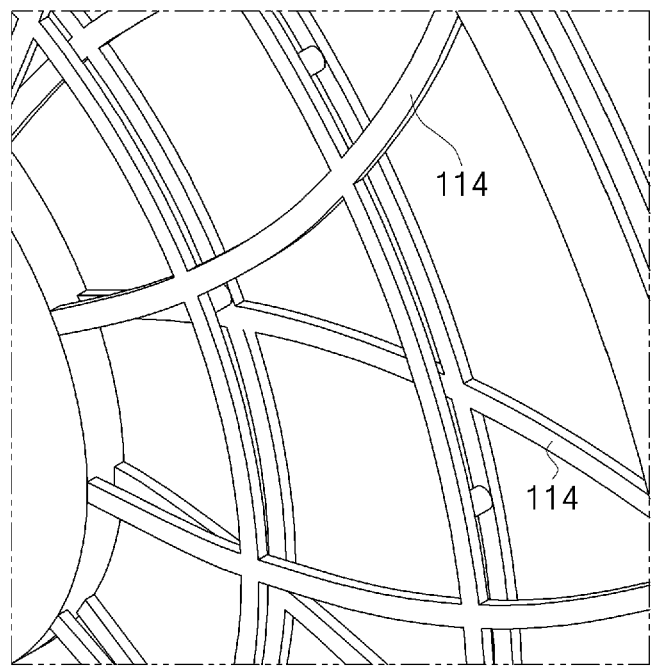

FIGS. 4, 5A and 5B illustrate various embodiments of the spacer 110. Referring to FIG. 4, a frame 112 of the spacer 110 has circumferential frame parts 113 formed in the circumferential direction and radial frame parts 114 formed in the radial direction to connect the circumferential frame parts 113. The spaces between the circumferential frame part 113 and the radial frame parts 114 form regions in which the cation exchange membrane 200 and the anion exchange membrane 210 are in contact with feed.

In addition, the frame 112 of the spacer 110 is arranged such that a pair of frames face each other and are spaced apart from each other by a predetermined distance, and a space between the pair of frames 112 forms a flow path through which feed flows. That is, the feed enters and exits the space between the frames 112 formed along the thickness direction of the spacer 110, and the introduced feed comes into contact with the cation exchange membrane 200 on one side and the anion exchange membrane 210 on the other side.

For example, the capacitive adsorption module assembly 10 according to the exemplary embodiment can rotate in feed. When the capacitive adsorption module 100 rotates, the radial frame part 114 of the spacer 110 serves to cause a flow in the feed like a paddle. Therefore, it is possible to promote the inflow and outflow of feed by variously designing the arrangement or shape of the radial frame parts 114.

Referring to FIG. 5A, the radial frame parts 114 of each of the pair of frames 112 are shifted so as not to face each other, which is different from the case of FIG. 4 in which the radial frame parts 114 overlap each other. This design is considered to facilitate a flow of feed by doubling the actual number of radial frame parts 114 in contact with feed.

Referring to FIG. 5B, each radial frame part 114 of the pair of frames 112 forms a curved line having curvature in opposite directions to each other. Because the curved radial frame part 114 has a longer length than that of a straight shape, the radial frame part has the effect of more contact with the feed. In addition, the radial frame parts 114 of each frame 112 may have an opposite curvature to cause more active disturbance in the feed, thereby improving capacitive adsorption efficiency.

The capacitive adsorption module assembly 10 may further include a rotary shaft 600 inserted through the stacked capacitive adsorption modules 100. The rotary shaft 600 may rotate the capacitive absorption module 100 using external power. By implementing the capacitive adsorption module 100 in a rotary type, it is possible to prevent damage to the cation exchange membrane 200 and the anion exchange membrane 210 due to clogging of the flow path inside the spacer 110 and fouling. Accordingly, the rotary type capacitive adsorption module assembly 10 enables the capacitive deionization apparatus to be adapted to a higher concentration feed environment.

Referring back to FIGS. 2 and 3, a first adapter 610 is mounted on one side of the rotary shaft 600 to fix and electrically connect the first terminal 400 of a first odd-numbered capacitive adsorption module 100. That is, an external power source may be connected to the first terminal 400 through the first adapter 610 insulated from the second terminal 410. In addition, a second adapter 620 is mounted on the other side of the rotary shaft 600 to fix and electrically connect the second terminal 410 of the last even-numbered capacitive adsorption module 100. The second adapter 620 is insulated from the first terminal 400.

By the configuration of the rotary shaft 600 and the first and second adapters 610 and 620 as described above, the first electrode 300 and the second electrode 310 of the capacitive adsorption module 100 may be respectively connected to only one side of the rotary shaft 600. That is, when a (+) power and a (−) power of an external DC power supply are connected to any one of the first adapter 610 and the second adapter 620, the entire stacked capacitive adsorption modules 100 may receive power in a monopolar manner.

Figure 8:
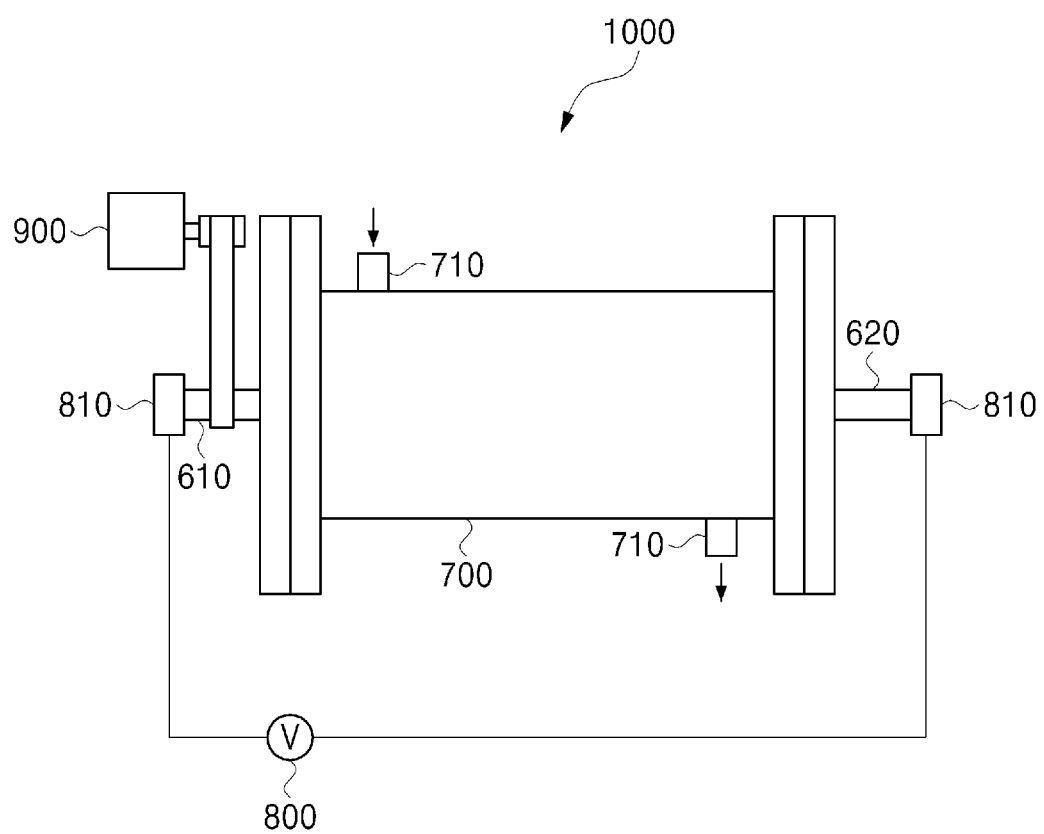
FIG. 8 is a view illustrating a capacitive deionization apparatus according to an exemplary embodiment.

FIG. 8 illustrates a capacitive deionization apparatus 1000 to which the capacitive adsorption module assembly 10 having the rotary shaft 600 is coupled. Referring to FIG. 8, the capacitive adsorption module assembly 10 having the rotary shaft 600 is hermetically accommodated in a casing 700. An end portion of the rotary shaft 600, for example, the first adapter 610 and the second adapter 620 are exposed to the outside of the casing 700 in which a feed passage 710 is formed. In addition, a power supply 800 supplies DC power to both ends of the rotary shaft 600 protruding to the outside of the casing 700, and a rotary driving unit 900 transmits a rotary driving force to the rotary shaft 600 to rotate the capacitive adsorption module assembly 10 in the casing 700 at a predetermined speed. Here, the power supply 800 may supply DC power to the rotary shaft 600, that is, the first adapter 610 and the second adapter 620, through a slip ring 810 such as a mercury slip ring or a brush slip ring.

Figure 9:
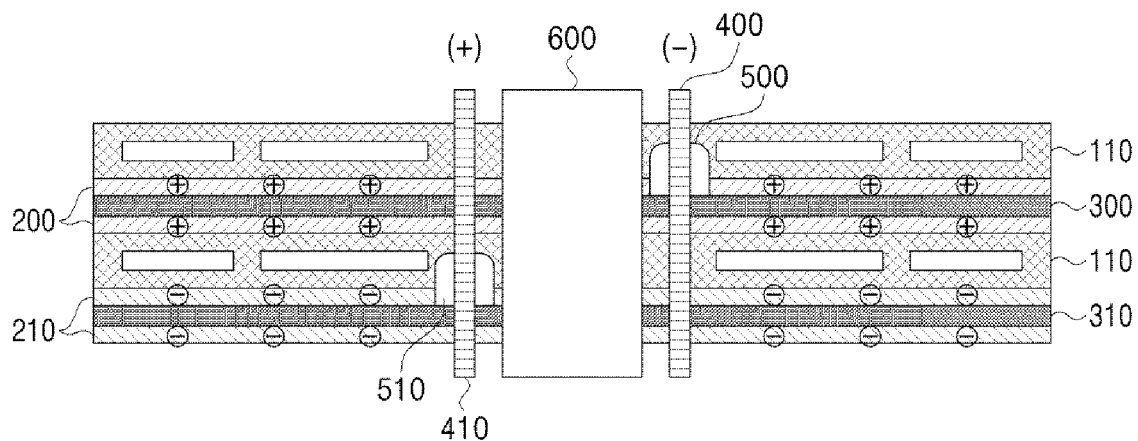
FIG. 9 is a view illustrating a state in which the capacitive deionization apparatus is operated in a charging mode.

FIG. 9 is a view illustrating a state in which the capacitive deionization apparatus is operated in a charging mode. The charging mode is a state in which dissolved ions in feed are adsorbed to the first electrode 300 and the second electrode 310. In the charging mode, the power supply 800 applies (−) power to one side of the rotary shaft 600 on which the first adapter 610 is mounted, and applies (+) power to one side of the rotary shaft 600 on which the second adapter 620 is mounted. That is, (−) power is applied to the first electrode 300 to which the cation exchange membrane 200 is attached, and (+) power is applied to the second electrode 310 to which the anion exchange membrane 210 is attached, thereby causing a capacitive adsorption action.

Figure 10:
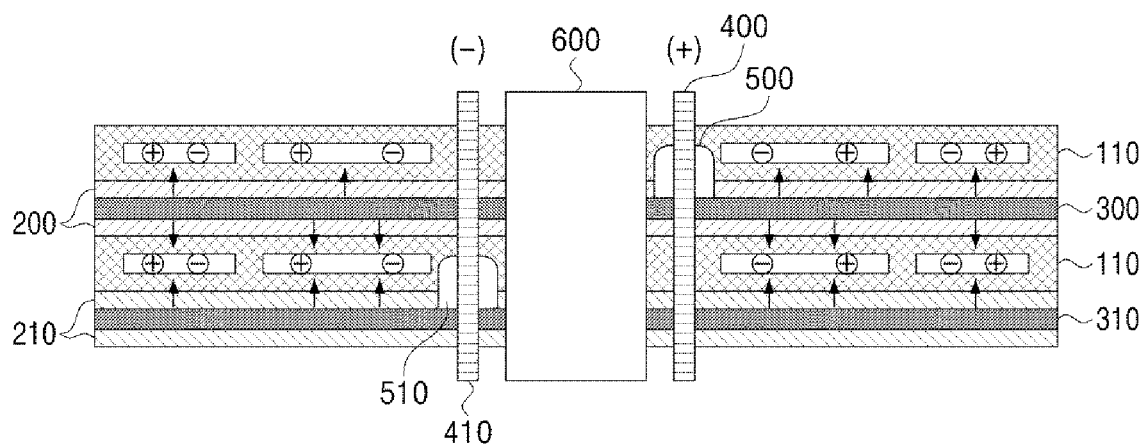
FIG. 10 is a view illustrating a state in which the capacitive deionization apparatus is operated in a discharging mode.

FIG. 10 is a view illustrating a state in which the capacitive deionization apparatus is operated in a discharging mode. In the discharging mode, the power supply 800 applies (+) power to one side of the rotary shaft 600 on which the first adapter 610 is mounted, and applies (−) power to one side of the rotary shaft 600 on which the second adapter 620 is mounted. That is, power is applied in an opposite polarity to the charging mode, so that dissolved ions adsorbed in the discharging mode are discharged to the outside of the capacitive absorption module assembly 10 by an electrical repulsive force.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A capacitive adsorption module assembly comprising:
a plurality of capacitive adsorption modules:
wherein each of the plurality of capacitive adsorption modules comprises:
a disk-shaped spacer configured to form a flow path through which feed flows;
a cation exchange membrane attached to any one of an upper surface and a lower surface of the spacer;
a first electrode attached to the cation exchange membrane;
an anion exchange membrane attached to the other of the upper surface and the lower surface of the spacer; and
a second electrode attached to the anion exchange membrane,
wherein the capacitive adsorption modules are vertically stacked such that adjacent capacitive adsorption modules share or contact the first electrode or the second electrode, and
wherein at least one first terminal and second terminal passing through the stacked capacitive adsorption modules are provided,
wherein the spacer includes a pair of frames spaced apart by a predetermined distance to face each other, and
wherein a space between the pair of frames forms a flow path through which the feed flows,
wherein each frame includes a circumferential frame part formed in a circumferential direction and a radial frame part formed in a radial direction to connect the circumferential frame part.

2. The capacitive adsorption module assembly according to claim 1, wherein the first terminal is electrically connected to the first electrode of an odd-numbered capacitive adsorption module, and the second terminal is electrically connected to the second electrode of an even-numbered capacitive adsorption module.

3. The capacitive adsorption module assembly according to claim 1, wherein each radial frame part of the pair of frames is disposed so as not to overlap or face each other.

4. The capacitive adsorption module assembly according to claim 1, wherein each radial frame part of the pair of frames forms a curve having curvature in opposite directions.

5. The capacitive adsorption module assembly according to claim 2, wherein the first terminal is embedded in the odd-numbered capacitive adsorption module and coupled to a first nut electrically connected to the first electrode and the second terminal is embedded in the even-numbered capacitive adsorption module and coupled to a second nut electrically connected to the second electrode.

6. The capacitive adsorption module assembly according to claim 5, wherein the stacked capacitive adsorption modules are fixed by the coupling between the first terminal and the first nut and the coupling between the second terminal and the second nut.

7. The capacitive adsorption module assembly according to claim 5, wherein the first terminal is fixed with an insulator for the even-numbered electro-adsorption module, and the second terminal is fixed with an insulator for the odd-numbered electro-adsorption module.

8. The capacitive adsorption module assembly according to claim 2, further comprising a rotary shaft inserted through the stacked capacitive absorption modules,
wherein a first adapter is provided on one side of the rotary shaft to fix and electrically connect the first terminal of a first odd-numbered capacitive absorption module, and a second adapter is provided on the other side of the rotary shaft to fix and electrically connect the second terminal of a last even-numbered capacitive absorption module.

9. A capacitive deionization apparatus comprising:
a capacitive adsorption module assembly comprising a plurality of capacitive adsorption modules, each of the plurality of capacitive adsorption modules comprising:
a disk-shaped spacer configured to form a flow path through which feed flows;
a cation exchange membrane attached to any one of an upper surface and a lower surface of the spacer;
a first electrode attached to the cation exchange membrane;
an anion exchange membrane attached to the other of the upper surface and the lower surface of the spacer;
a second electrode attached to the anion exchange membrane; and
a rotary shaft inserted through the stacked capacitive absorption modules,
wherein the capacitive adsorption modules are vertically stacked such that adjacent capacitive adsorption modules share or contact the first electrode or the second electrode, and
wherein at least one first terminal and second terminal passing through the stacked capacitive adsorption modules are provided, and wherein the first terminal is electrically connected to the first electrode of an odd-numbered capacitive adsorption module, and the second terminal is electrically connected to the second electrode of an even-numbered capacitive adsorption module,
a casing hermetically accommodating the capacitive absorption module assembly and having a feed passage;
a power source configured to supply DC power to both ends of the rotary shaft protruding to an outside of the casing; and
a rotary driving unit configured to drive the rotary shaft.

10. The capacitive deionization apparatus according to claim 9, wherein a first adapter is provided on one side of the rotary shaft to fix and electrically connect the first terminal of a first odd-numbered capacitive absorption module, and a second adapter is provided on the other side of the rotary shaft to fix and electrically connect the second terminal of a last even-numbered capacitive absorption module.

11. The capacitive deionization apparatus according to claim 9, wherein the power source supplies DC power to the rotary shaft via a slip ring.

12. The capacitive deionization apparatus according to claim 9, wherein the power source supplies power to the capacitive adsorption module assembly such that (—) power is applied to one side of the rotary shaft on which the first adapter is mounted, and (+) power is applied to one side of the rotary shaft on which the second adapter is mounted so that the capacitive absorption module assembly is operated in a charging mode.

13. The capacitive deionization apparatus according to claim 11, wherein the power source supplies power to the capacitive adsorption module assembly such that (—) power is applied to one side of the rotary shaft on which the first adapter is mounted, and (+) power is applied to one side of the rotary shaft on which the second adapter is mounted so that the capacitive absorption module assembly is operated in a charging mode.

14. The capacitive deionization apparatus according to claim 9, wherein the power source supplies power to the capacitive adsorption module assembly such that (+) power is applied to one side of the rotary shaft on which the first adapter is mounted, and (—) power is applied to one side of the rotary shaft on which the second adapter is mounted is applied so that the capacitive absorption module assembly is operated in a discharging mode.

15. The capacitive deionization apparatus according to claim 11, wherein the power source supplies power to the capacitive adsorption module assembly such that (+) power is applied to one side of the rotary shaft on which the first adapter is mounted, and (—) power is applied to one side of the rotary shaft on which the second adapter is mounted is applied so that the capacitive absorption module assembly is operated in a discharging mode.

16. A capacitive adsorption module assembly comprising:
a plurality of capacitive adsorption modules:
wherein each of the plurality of capacitive adsorption modules comprises:
a disk-shaped spacer configured to form a flow path through which feed flows;
a cation exchange membrane attached to any one of an upper surface and a lower surface of the spacer;
a first electrode attached to the cation exchange membrane;
an anion exchange membrane attached to the other of the upper surface and the lower surface of the spacer;
a second electrode attached to the anion exchange membrane; and
a rotary shaft inserted through the stacked capacitive absorption modules,
wherein the capacitive adsorption modules are vertically stacked such that adjacent capacitive adsorption modules share or contact the first electrode or the second electrode, and
wherein at least one first terminal and second terminal passing through the stacked capacitive adsorption modules are provided,
wherein the first terminal is electrically connected to the first electrode of an odd-numbered capacitive adsorption module, and the second terminal is electrically connected to the second electrode of an even-numbered capacitive adsorption module,
wherein a first adapter is provided on one side of the rotary shaft to fix and electrically connect the first terminal of a first odd-numbered capacitive absorption module, and a second adapter is provided on the other side of the rotary shaft to fix and electrically connect the second terminal of a last even-numbered capacitive absorption module.

* * * * *